(12) United States Patent
Miyamoto (10) Patent No.: US 7,428,952 B2
(45) Date of Patent: Sep. 30, 2008

(54) DAMPER DEVICE (75) Inventor: Makoto Miyamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/783,317

(22) Filed: Apr. 9, 2007

(65) Prior Publication Data
US 2007/0278725 A1 Dec. 6, 2007

(30) Foreign Application Priority Data
May 31, 2006 (JP) ............................. 2006-151227

(51) Int. Cl.
*F16D 57/02* (2006.01)
(52) U.S. Cl. ............................. 188/290; 16/51; 188/293
(58) Field of Classification Search ......... 188/290–296, 188/322.5; 16/51
See application file for complete search history.

(56) References Cited

U.S. PATENT DOCUMENTS

| | | | |
|---|---|---|---|
| 2,514,137 A * | 7/1950 | O'Connor | 188/290 |
| 3,651,903 A * | 3/1972 | Butler et al. | 188/290 |
| 4,938,322 A * | 7/1990 | Sugasawara et al. | 188/290 |
| 5,301,775 A * | 4/1994 | Nedbal et al. | 188/290 |
| 5,305,858 A * | 4/1994 | Haga et al. | 188/271 |
| 7,216,744 B2 * | 5/2007 | Mower | 188/71.5 |

FOREIGN PATENT DOCUMENTS

JP 2004-150575 5/2004

* cited by examiner

*Primary Examiner*—Christopher P Schwartz
(74) *Attorney, Agent, or Firm*—McDermott Will Emery LLP

(57) ABSTRACT

A damper device used in a range of electronic apparatuses. The damper device allows a diverse opening and closing operations by means of a simple structure. A stationary plate and a movable plate resiliently contact, due to the action of a spring, over different contact areas as a movable shaft rotates. This enables a change in a damping force in accordance with opening and closing angles. Accordingly the damper device which allows diverse opening and closing operations, such as to open at a constant speed from immediately after starting to open, is achievable by means of a simple structure.

3 Claims, 7 Drawing Sheets

PRIOR ART

FIG. 6

PRIOR ART

FIG. 7

PRIOR ART

DAMPER DEVICE

BACKGROUND OF THE INVENTION

1. Field of the Invention

The present invention relates to damper devices used for electronic apparatuses such as mobile phones and personal computers.

2. Background Art

With electronic apparatuses such as mobile phones and personal computers becoming increasingly smaller and lighter, many products are adopting designs that attach a movable housing to a stationary housing in an openable and closable manner, a so-called folding design. In response to this trend, hinge devices and damper devices used in these electronic apparatuses are also required to ensure reliable and diverse opening and closing operations.

A conventional damper device is described next with reference to FIGS. 5 to 7.

Figure 6:
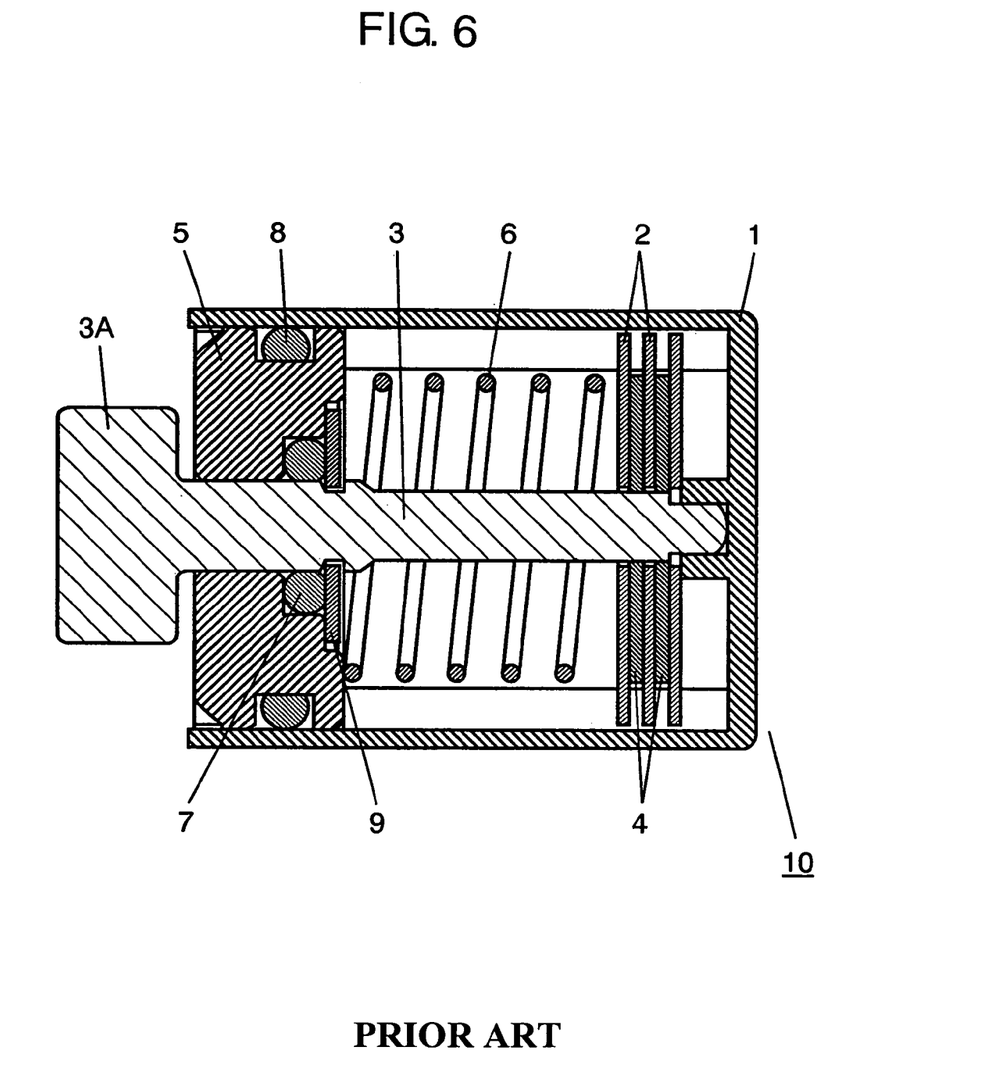
FIG. 6 is a sectional view of a conventional damper device.
Figure 7:
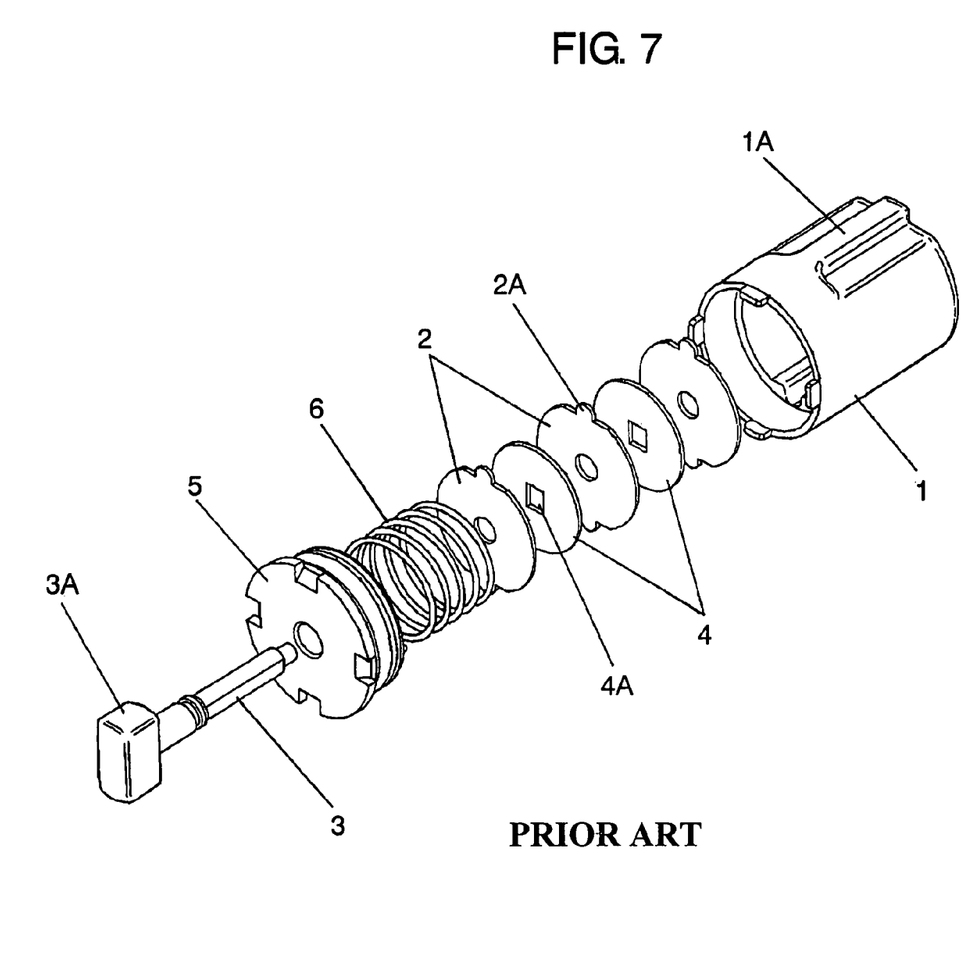
FIG. 7 is an exploded perspective view of the conventional damper device.

FIG. 6 is a sectional view and FIG. 7 is an exploded perspective view of the conventional damper device. In these drawings, protrusion 2A projecting outward is formed on a periphery of each of multiple disk-like stationary plates 2 made of metal. Stationary plates 2 are housed in stationary case 1 in a movable manner in an axial direction by inserting this protrusion 2A into groove 1A in substantially cylindrical stationary case 1 made of metal. This axis is a central axis of substantially-cylindrical stationary case 1. Stationary plates 2 do not rotate relative to stationary case 1 when movable shaft 3 rotates, which is described later, by the presence of protrusion 2A.

Multiple disk-like movable plates 4 made of metal are alternately sandwiched between stationary plates 2, and square hole 4A is created at the center of each of movable plates 4. Substantially prismatic movable shaft 3 made of metal, inserted into stationary case 1, passes through this square hole 4A, and thus movable plates 4 are attached to movable shaft 3 in a movable manner in an axial direction. Movable plates 4 rotate in response to the rotation of movable shaft 3 by inserting substantially prismatic movable shaft 3 through square hole 4A of each movable plate 4.

Coiled spring 6 is set between the right side face (the right side in FIG. 6, hereinafter) of cover 5, which covers an opening in the left end face (the left side in FIG. 6, hereinafter) of stationary case 1, and stationary plate 2 in a slightly compressed state. In this way, stationary plates 2 and movable plates 4 contact in resilient manner. A high-viscosity lubricant (not illustrated) is applied between stationary plates 2 and movable plates 4.

Ring-like O-ring 7, typically made of rubber, is set between cover 5 and movable shaft 3 in a slightly but entirely compressed state by stopper ring 9, and ring-like O-ring 8, typically made of rubber, is set between cover 5 and stationary case 1 so as to hermetically seal the interior of stationary case 1.

The right end of movable shaft 3, to which movable plates 4 and stationary plates 2 are attached, is rotatably held by the inner side face of stationary case 1. Attachment part 3A formed at the left end of movable shaft 3 rotatably protrudes from the left side face of cover 5. This configures damper device 10.

Figure 5:
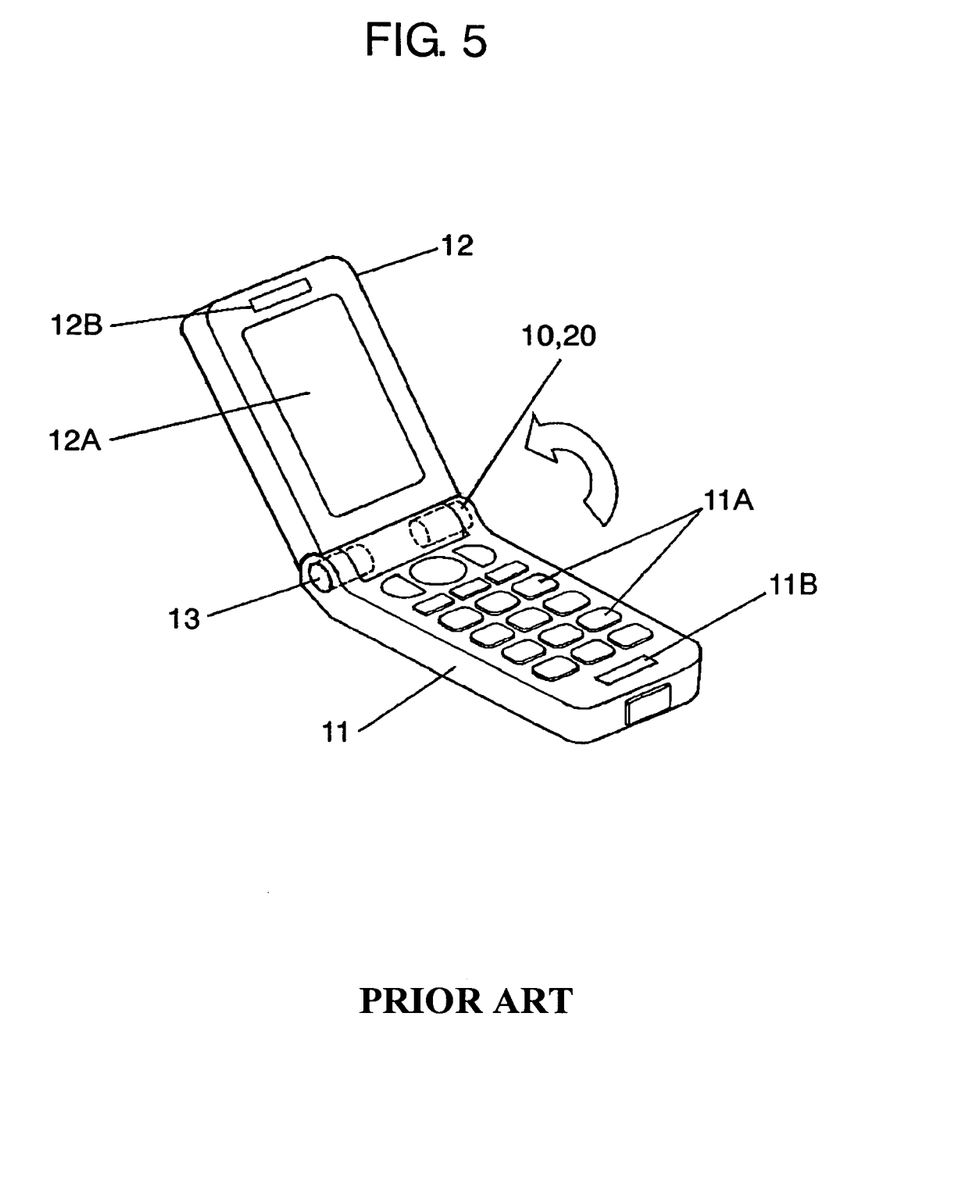
FIG. 5 is a perspective view of a mobile phone.

Damper device 10 as configured above is installed in a mobile phone, for example, shown in a perspective view in FIG. 5. More specifically, stationary case 1 is fixed to stationary housing 11 where control panel 11A such as keys and sound input part 11B such as a microphone are formed on its top face. Attachment part 3A of movable shaft 3 is fixed to movable housing 12 where display 12A such as LCD and sound output part 12B such as a speaker are formed on its surface.

Hinge device 13 configured with components including multiple cams (not illustrated) and spring (not illustrated) is mounted between stationary housing 11 and movable housing 12. An electronic apparatus is configured such that this hinge device 13 applies a force to movable housing 12 in a closing direction and opening direction relative to stationary housing 11.

In the above structure, when a button (not illustrated), for example, on the side face of stationary housing 11 is pushed for operation while movable housing 12 is closed, the cams, spring, and so on of hinge device 13 act to apply a force in the opening direction to movable housing 12. Accordingly, movable housing 12 starts to open.

Then, movable shaft 3 whose attachment part 3A is fixed to movable housing 12 rotates in the opening direction, and movable plates 4 attached to movable shaft 3 rotate. Stationary plates 2, which are alternately disposed between movable plates 4 and attached to stationary case 1, resiliently contact these movable plates 4 due to the action of spring 6. In addition, a high-viscosity lubricant is applied between movable plates 4 and stationary plates 2. Accordingly, a resistance force (damping force) against the opening direction is generated between movable plates 4 and stationary plates 2.

In other words, hinge device 13 applies the force in the opening direction to movable housing 12, but damper device 10 applies the resistance force against the opening direction at the same time. Accordingly, movable housing 12 opens gradually instead of suddenly.

In general, the force of hinge device 13 to open movable housing 12 is the greatest immediately after movable housing 12 starts to open, and this force becomes smaller as an opening angle becomes wider. On the other hand, the resistance force of damper device 10, i.e., the damping force, is constant, regardless of the opening angle, because this force is the resistance force generated between disk-like movable plates 4 and stationary plates 2 which resiliently contact via the lubricant.

In other words, damper device 10 applies a constant resistance force to movable housing 12 so as to gradually open movable housing 12, and thus the opening speed is determined by the force of hinge device 13 to open movable housing 12.

Accordingly, movable housing 12 opens fast immediately after the operation, and then the opening speed slows as the opening angle becomes wider.

One known prior art is Japanese Patent Unexamined Publication No. 2004-150575.

In the conventional damper device, however, only a constant damping force can be obtained because the damping force is the resistance force generated between disk-like movable plates 4 and stationary plates 2 which contact resiliently via the lubricant. The opening speed of movable housing 12 is thus determined by the force of hinge device 13 to open movable housing 12. Accordingly, the conventional damper device cannot be applied to diverse opening and closing operations, such as to open movable housing 12 at a constant speed from immediately after starting to open until movable housing 12 opens to a predetermined angle.

SUMMARY OF THE INVENTION

The present invention solves the above disadvantage of the prior art, and offers a damper device which allows diverse opening and closing operations by means of a simple structure.

The damper device of the present invention gives a stationary plate and a movable plate, which resiliently contact due to the action of a spring, different contact areas in response to the rotation of a movable shaft. A damping force can be changed in response to an opening or closing angle by making the stationary plate and the movable plate resiliently contact over different contact areas in response to the rotation. With this simple structure, the damper device which allows diverse opening and closing operations, such as to open at a constant speed from immediately after starting to open, is achievable.

DETAILED DESCRIPTION OF THE INVENTION

An exemplary embodiment of the present invention is described below with reference to FIGS. 1 to 5.

Components which have the same structure as that described in the Background Art are given the same reference numerals, and thus their detailed description is omitted below.

Embodiment

Figure 1:
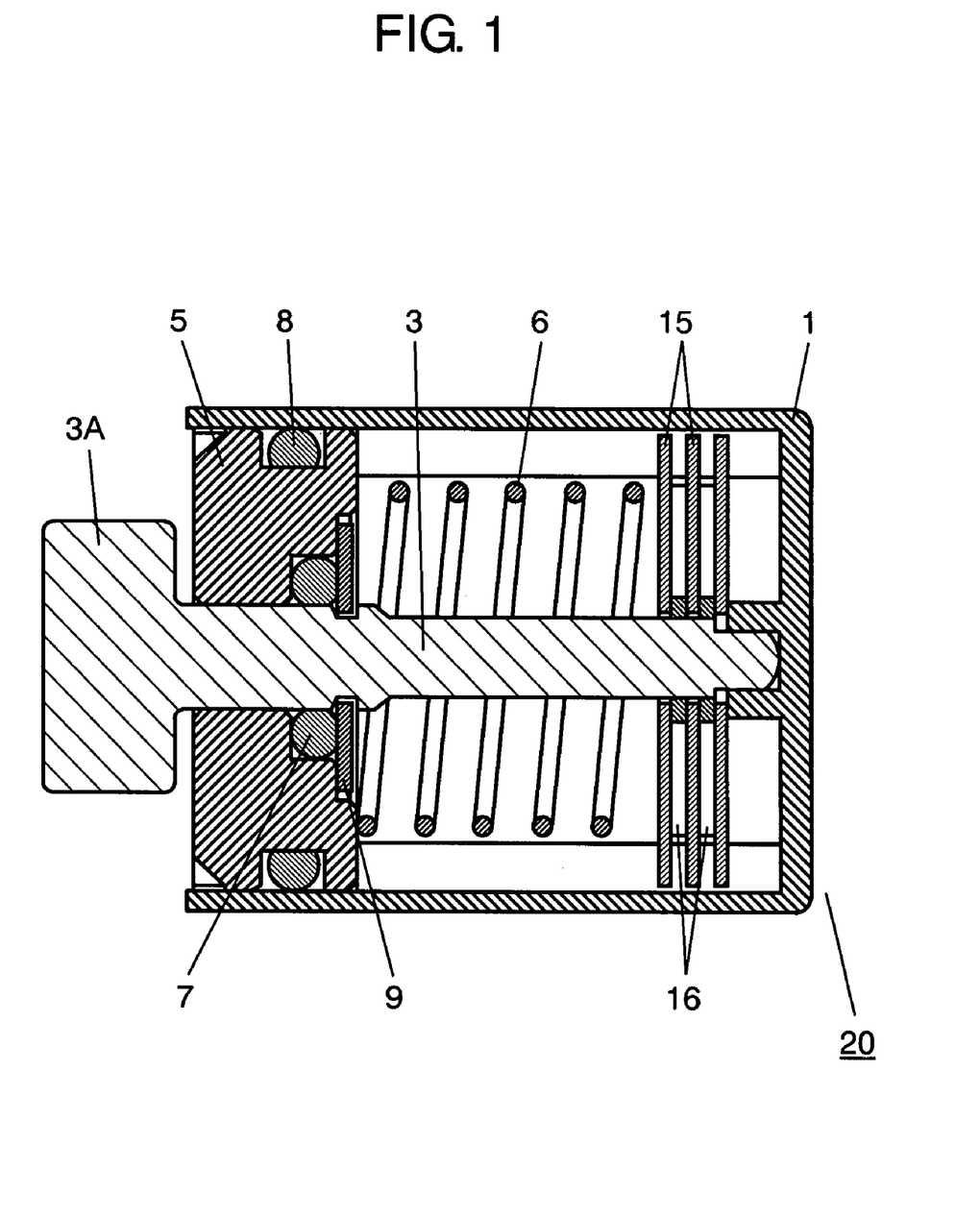
FIG. 1 is a sectional view of a damper device in accordance with an exemplary embodiment of the present invention.
Figure 2:
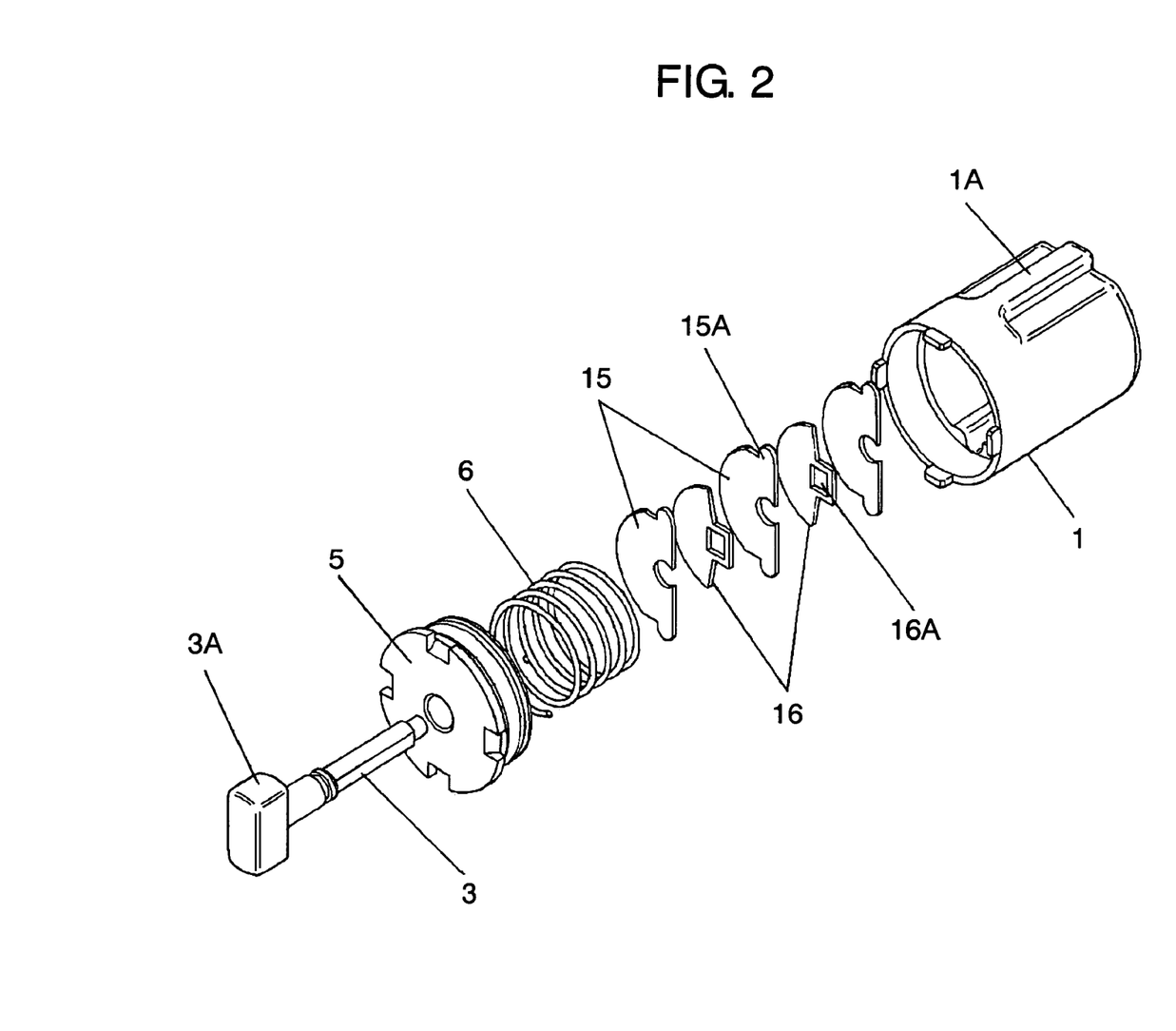
FIG. 2 is an exploded perspective view of the damper device in accordance with the exemplary embodiment of the present invention.

FIG. 1 is a sectional view and FIG. 2 is an exploded perspective view of a damper device in the exemplary embodiment of the present invention. In the drawings, protrusion 15A projecting outward is formed on a periphery of each of substantially semicircular multiple stationary plates 15 made of metal. Stationary plates 15 are housed inside stationary case 1 in a movable manner in an axial direction by inserting this protrusion 15A into groove 1A in stationary case 1 made of metal such as sintered alloy. Stationary plates 15 are not limited to a substantially semicircular shape. They may also have a fan-like shape.

Stationary plates 15 do not rotate relative to stationary case 1 when movable shaft 3 rotates, which is described later, by the presence of protrusion 15A.

Multiple fan-like movable plates 16 made of metal are alternately sandwiched between stationary plates 15, and square hole 16A is created at the center of each of movable plates 16. Substantially prismatic movable shaft 3 made of metal, inserted into stationary case 1, passes through this square hole 16A, and movable plates 16 are attached to movable shaft 3 in a movable manner in an axial direction. These movable plates 16 are not limited to a fan-like shape. They may also have a substantially semicircular shape.

Movable plates 16 rotate in response to the rotation of movable shaft 3 by inserting substantially prismatic movable shaft 3 through square hole 16A of each movable plate 16.

Coiled spring 6 made of steel wire is attached between the right side face (the right side in FIG. 1, hereinafter) of cover 5, which covers an opening in the left side face (the left side in FIG. 1, hereinafter) of stationary case 1, and stationary plate 15 in a slightly compressed state. In this way, stationary plates 15 and movable plates 16 contact in resilient manner. A high-viscosity lubricant (not illustrated), such as a silicone, olefin, or fluorine lubricant is applied between stationary plates 15 and movable plates 16.

Ring-like O-ring 7, typically made of rubber, is set between cover 5 and movable shaft 3 in a slightly but entirely compressed state by stopper ring 9, and ring-like O-ring 8, typically made of rubber, is set between cover 5 and stationary case 1 so as to hermetically seal the interior of stationary case 1.

Then, the right end of movable shaft 3, to which movable plates 16 and stationary plates 15 are attached, is rotatably held by the inner side face of stationary case 1. Attachment part 3A formed at the left end of movable shaft 3 rotatably protrudes from the left side face of cover 5. This configures damper device 20.

Damper device 20 as configured above is installed in a mobile phone, for example, shown in a perspective view in FIG. 5. More specifically, stationary case 1 is fixed to stationary housing 11 where control panel 11A such as keys and sound input part 11B such as a microphone are formed on its top face. Attachment part 3A of movable shaft 3 is fixed to movable housing 12 where display 12A such as LCD and sound output part 12B such as a speaker are formed on its surface.

Hinge device 13 configured with components including multiple cams (not illustrated) and spring (not illustrated) is mounted between stationary housing 11 and movable housing 12. An electronic apparatus is configured such that this hinge device 13 applies a force to movable housing 12 in a closing direction and opening direction relative to stationary housing 11.

In the above structure, when a button (not illustrated), for example, on the side face of stationary housing 11 is pressed while movable housing 12 is closed, the cams, spring, and so on configuring hinge device 13 act to apply a force in the opening direction to movable housing 12. Accordingly, movable housing 12 starts to open.

In general, the force of hinge device 13 to open movable housing 12 is the greatest immediately after movable housing 12 starts to open, and this force becomes smaller as the opening angle becomes wider. Accordingly, movable housing 12 opens quickly immediately after operation, after which its opening speed gradually slows as the opening angle becomes wider, assuming the damping force is constant.

In this exemplary embodiment, when an opening operation takes place, movable shaft 3 whose attachment part 3A is fixed to movable housing 12 also rotates in the opening direction, and movable plates 16 attached to movable shaft 3 rotate. Stationary plates, which are alternately disposed between movable plates 16 and attached to stationary case 1, resiliently contact these movable plates 16 due to the action of spring 6. In addition, the high-viscosity lubricant is applied between movable plates 16 and stationary plates 15. Accordingly, a resistance force (damping force) against the opening direction is generated between movable plates 16 and stationary plates 15.

Figure 3A:
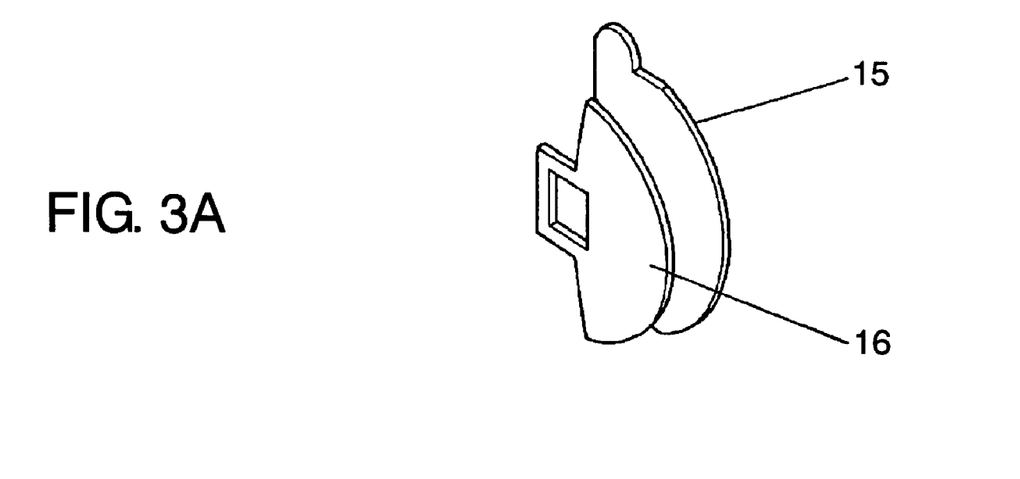
FIGS. 3A, 3B, and 3C are fragmentary perspective views of the damper device in accordance with the exemplary embodiment of the present invention.
Figure 3B:
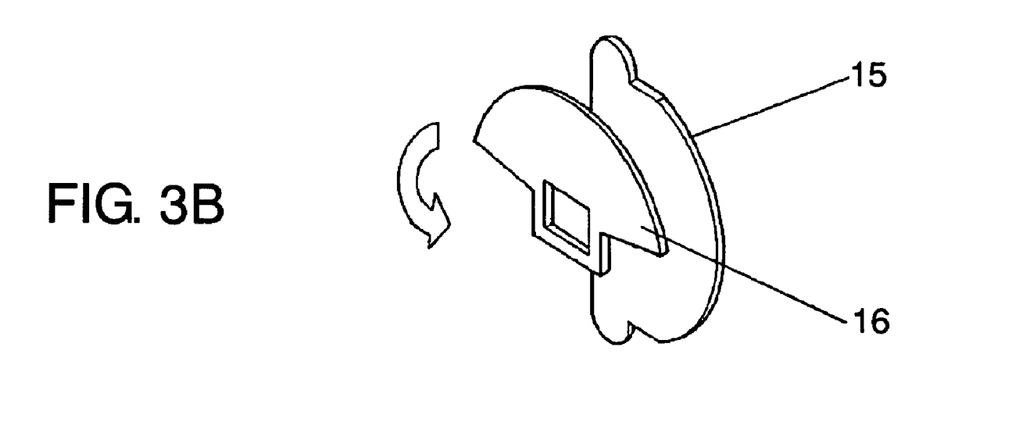
Figure 3C:
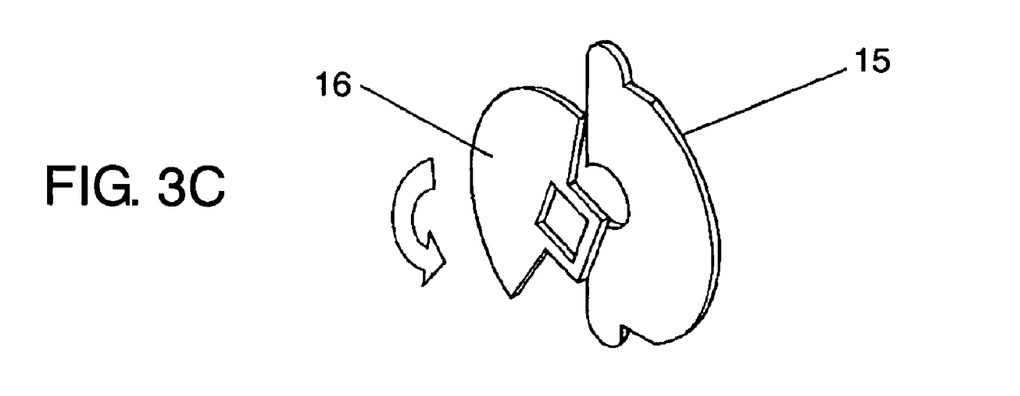
Figure 4A:
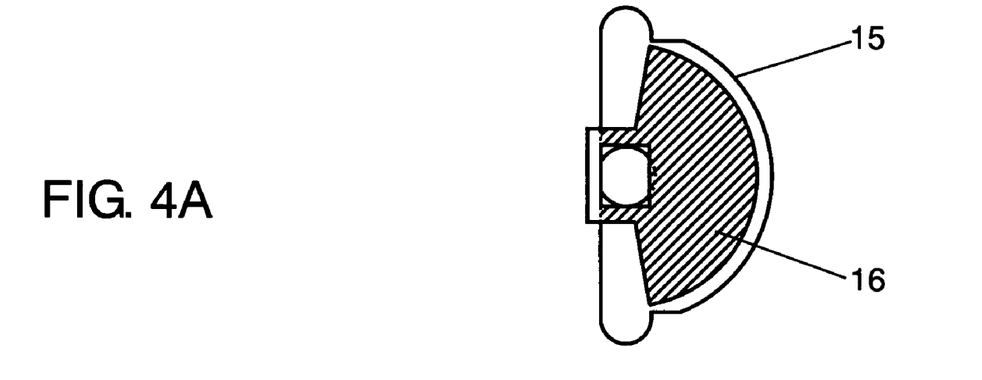
FIGS. 4A, 4B, and 4C are plan views of the damper device in accordance with the exemplary embodiment of the present invention.
Figure 4B:
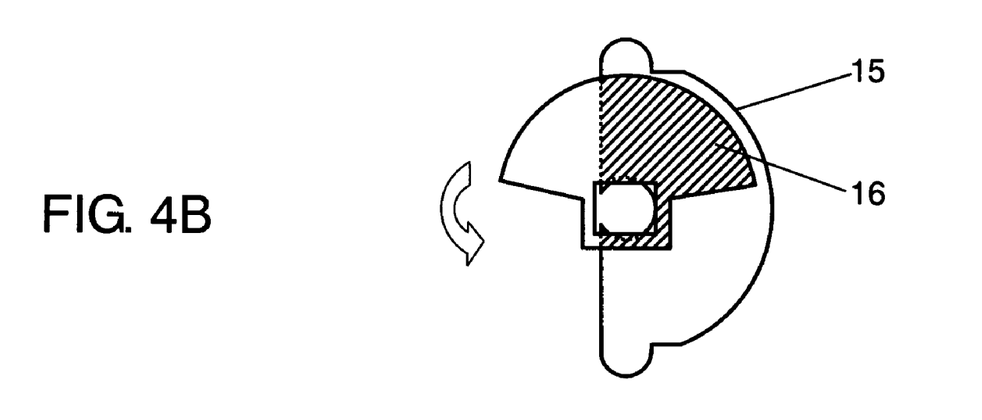
Figure 4C:
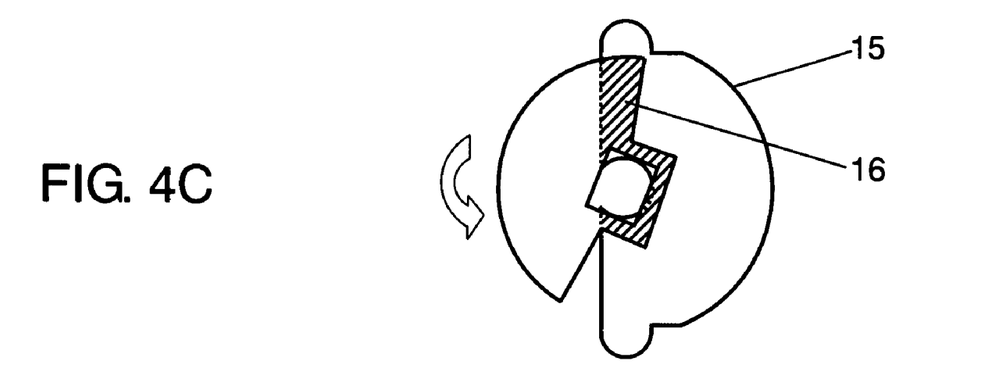

Since stationary plates 15 and movable plates 16 have shapes other than a disk shape, such as substantially semicircular stationary plates 15 and fan-like movable plates 16, stationary plates 15 and movable plates 16 resiliently contact over different contact areas as movable shaft 3 rotates, as shown in fragmentary perspective views in FIGS. 3A, 3B, and 3C, and plan views in FIGS. 4A, 4B, and 4C.

More specifically, when movable housing 12 is closed, i.e., the opening and closing angle is 0°, as in FIG. 3A and FIG. 4A, stationary plates 15 and movable plates 16 are in resilient contact via the lubricant over a large contact area, which is the entire area of movable plate 16. This area is shown by the hatched lines in FIG. 4A. Accordingly, the resistance force between movable plates 16 and stationary plates 15 against the opening direction, i.e., the damping force, is the greatest.

Then, when movable housing 12 is opened from this closed state to a predetermined angle, such as 90°, as shown in FIG. 3B and FIG. 4B, the contact area between each stationary plate 15 and each movable plate 16 is about a half of that of movable plate 16. This is shown by the hatched lines in FIG. 4B.

Then, when movable housing 12 is further opened to 160°, as shown in FIG. 3C and FIG. 4C, the contact area between each stationary plate 15 and each movable plate 16 further reduces, as shown by the hatched lines in FIG. 4C. The resistance force, i.e., the damping force, against the opening direction becomes the smallest.

More specifically, the damping force of damper device 20 is the greatest when the opening and closing angle is around 0°, at which the force of hinge device 3 to open movable housing 12 is the greatest. Then, as the opening angle widens and the opening force of hinge device 13 decreases, the damping force of damper device 20 also decreases.

In other words, movable housing 12 can be opened at a constant and moderate speed from immediately after starting to open until it opens to a predetermined angle by varying the damping force of damper device 20 relative to the opening and closing angle or the force applied by hinge device 13 to open movable housing 12.

As described above, in the exemplary embodiment, the damping force can be changed in response to the opening and closing angle by giving stationary plate 15 and movable plate 16, which resiliently contact each other due to the action of spring 6, different contact areas in response to the rotation of movable shaft 3. Accordingly, a damper device which allows diverse opening and closing operations, such as to open at a constant speed from immediately after starting to open, is achievable by means of a simple structure.

The above description refers to the operation of mainly opening movable housing 12. However, it is apparent that the same effect is achievable to the closing of movable housing 12. Furthermore, movable housing 12 can be opened and closed at different speeds according to the opening and closing angle by varying the shapes of stationary plate 15 and movable plate 16, so as to vary the contact area, in response to different opening and closing forces of hinge devices other than the above.

In the above description, the resistance force that acts against the opening and closing direction, i.e., the damping force, is generated between movable plate 16 and stationary plate 15 by applying a high-viscosity lubricant between each of stationary plates 15 and movable plates 16. However, the present invention is also feasible by a direct resilient contact of movable plate 16 and stationary plate 15 made of highly viscous materials such as polyoxymethylene, or lubricant-impregnated materials.

The damper device of the present invention is applicable to a variety of opening and closing operations by means of a simple structure, and thus is advantageous as a damper device for a range of electronic apparatuses.

What is claimed is:

1. A damper device comprising:
   a substantially cylindrical stationary case;
   a stationary plate housed in the stationary case in a movable manner in an axial direction, the stationary plate having a shape of one of a semicircular shape and a sector shape;
   a movable shaft rotatably inserted into the stationary case;
   a movable plate attached to the movable shaft in a movable manner in an axial direction, the movable plate having a semicircular shape when the stationary plate has a sector shape, and the movable plate having a sector shape when the stationary plate has a semicircular shape; and
   a spring making the stationary plate and the movable plate resiliently contact;
   wherein the stationary plate and the movable plate resiliently contact over a different contact area as the movable shaft rotates, and
   wherein the contact area of the stationary plate and the movable plate decreases continuously from its maximum value or increases continuously from its minimum value according to a rotation angle of the movable shaft.

2. The damper device of claim 1, further comprising:
   a groove in the stationary case; and
   a protrusion in the stationary plate, the protrusion being inserted into the groove;
   wherein the movable plate rotates in response to a rotation of the movable shaft, and a resistance force corresponding to the contact area of the stationary plate and the movable plate is generated in response to the rotation of the movable shaft.

3. The damper device of one of claims 1 and 2, wherein at least one of the stationary plate and the movable plate has one of a substantially semicircular shape and a fan-like shape.

* * * * *